United States Patent [19]
Mita

[11] Patent Number: 5,291,596
[45] Date of Patent: Mar. 1, 1994

[54] DATA MANAGEMENT METHOD AND SYSTEM WITH MANAGEMENT TABLE INDICATING RIGHT OF USE

[75] Inventor: Makoto Mita, Saitama, Japan

[73] Assignee: Fuji Xerox Co., Ltd., Tokyo, Japan

[21] Appl. No.: 22,419

[22] Filed: Feb. 16, 1993

Related U.S. Application Data

[63] Continuation of Ser. No. 595,879, Oct. 10, 1990, abandoned.

[51] Int. Cl.$^5$ ........................ G06F 12/14; G06F 15/16
[52] U.S. Cl. ............................... 395/600; 364/DIG. 1; 364/242.94; 364/284.3; 364/284.4; 364/286.4
[58] Field of Search ................. 395/600; 364/DIG. 1, 364/242.94, 284.3, 284.4, 286.4

[56] References Cited
U.S. PATENT DOCUMENTS
4,780,821  10/1988  Crossley ............................. 364/200

Primary Examiner—Gareth D. Shaw
Assistant Examiner—A. Katbab
Attorney, Agent, or Firm—Finnegan, Henderson, Farabow, Garrett & Dunner

[57] ABSTRACT

A data management system comprising, a management device, wherein the management device comprises, a plurality of data, a table formation device for forming a management table indicating respective conditions of a right of use for each one of the plurality of data, a use authorization determination device for determining whether a request for the right of use for one of the plurality of data is authorized by reference to the management table, and a use allocation device for granting the right of use for one of the plurality of data on the basis of a determination by the use authorization determination device. The data management system also includes a plurality of information processing devices, each one of the plurality comprising, a use authorization request device for requesting from the management device a grant of the right of use for one of the plurality of data, and a data storage devices for storing at least one of the plurality of data upon transfer of the one of the plurality of data from the management device and, a connection cable between the management device and the plurality of information processing devices, whereby a network is formed and whereby data is transferred.

2 Claims, 4 Drawing Sheets (PRIOR ART)

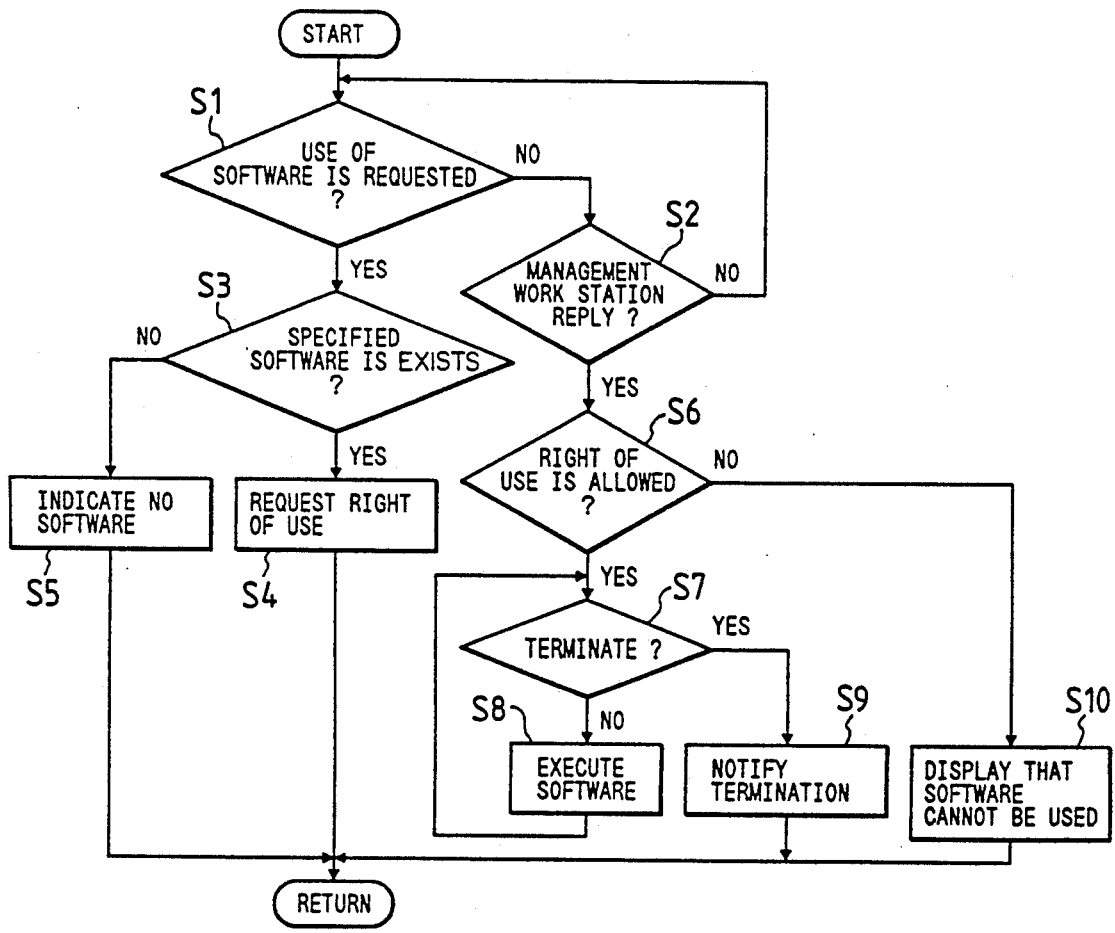

DATA MANAGEMENT METHOD AND SYSTEM WITH MANAGEMENT TABLE INDICATING RIGHT OF USE

This application is a continuation of application Ser. No. 07/595,879, filed Oct. 10, 1990, now abandoned.

BACKGROUND OF THE INVENTION

1. Field of the Invention

The present invention relates to a data management system for managing data used by an information processing apparatus connected to a network, and particularly to a data management system capable of managing economically valuable data such as software programs in a network.

2. Discussion of the Related Art

Information networks are known in the art. Networks have typically been implemented in business establishments such as building, factories, plants, etc., by routing cables between various terminals and equipment. In such a network, data and software are loaded in information processing devices, such as work stations, in accordance with a user's demands. Network users typically require additional software capabilities beyond those provided in their information processing device. For example, a user may require a graphics capability at a certain work station, and the graphics software must, therefore, be loaded in the work station. Another user may wish to perform accounting at another work station, and the accounting software must be loaded in the other work station. Thus, where software in addition to that originally provided in an information processing device is required, it is necessary for the user of the information processing device to make an agreement with an offerer of the additional software and to pay rent for the software to the offerer.

As a rule, conventional networks establish a right of use for particular software for each information processing device in which the software is to be used. FIG. 5 shows a network in which a conventional data management system manages the right of use. In the illustrated network, twenty five work stations 12-1 to 12-25 are connected to a cable 11. As an example, it is assumed that three work stations, 12-1, 12-2, and 12-3, wish to use software "A" and eleven work stations, 12-3, and 12-15–12-24, wish to use software "B." Accordingly, an agreement with respect to the use of software "A" has been separately made by each of the above three work stations and an agreement with respect to the use of software "B" has been separately made by each of the above eleven work stations.

In the conventional data management system, several problems exist with respect to the management of software and the fact that management is performed for each separate information processing device. In an arrangement where software is freely available for use among multiple information processing devices connected in a network, it is necessary to establish the software right of use in all the information processing devices. As a result, the rent for the software, or other such data, becomes unreasonably expensive.

Considering the case above where three or eleven information processing devices can use the specified software, it does not necessarily follow that each information processing device will actually use the specified software for the entire time period agreed upon. For example, an information processing device which has made an agreement with respect to the use of software "A," may also have made an agreement with respect to the use of software "B." (See work station 12-3 in the above example.) Accordingly, when an agreement is made with respect to the use of specified software, or other such data, it does not necessarily follow that the information processing device will actually use the specified software for the entire time period agreed upon. As a result, it is difficult to fairly calculate the rent due.

SUMMARY OF THE INVENTION

The present invention has been made in view of the above circumstances and has a first object to provide a data management system capable of managing of use of software and other such data throughout an entire network.

A second object of the present invention is to provide a data management system capable of establishing a right of use for software throughout an entire network.

A third object of the present invention is to provide a data management system capable of easily managing the right of use.

A fourth object of the present invention is to provide a data management system capable of strictly managing the amount of time agreed upon for use of the software and other such data.

A fifth object of the present invention is to provide a data management system capable of fairly managing the right of use and calculating the rent due as a result of such use.

A sixth object of the present invention is to provide a data management system capable of reliably managing the right of use.

A seventh object of the present invention is to provide a data management system in which the right of use for important software or other such data can be obtained on a priority basis.

A eighth object of the present invention is to provide a data management system in which any difference can be provided in request for right of use of data.

Additional objects and advantages of the invention will be set forth in part in the description which follows and in part will be obvious from the description, of may be learned by practice of the invention. The objects and advantages of the invention may be realized and attained by means of the instrumentalities and combinations particularly pointed out in the appended claims.

To achieve the above first object and in accordance with the purpose of the invention, as embodied and broadly described herein, the data management system comprises: a management device, wherein the management device comprises, a plurality of data, a table formation device for forming a management table indicating respective conditions of a right of use for each one of the plurality of data, a use authorization determination device for determining whether a request for the right of use for one of the plurality of data is authorized by reference to the management table, and a use allocation device for granting the right of use for one of the plurality of data on the basis of a determination by the use authorization determination device. The data management system also includes a plurality of information processing devices, each one of the plurality comprising, a use authorization request device for requesting from the management device a grant of the right of use for one of the plurality of data, and a data storage devices for storing at least one of the plurality of data upon transfer of the one of the plurality of data from the management device and, a connection cable between the management device and the plurality of information processing devices, whereby a network is formed and whereby data is transferred.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 4 is a flowchart showing the main portion of the control contents of an ordinary work station of the system in FIG. 1; and, FIG. 5 is a block diagram showing the outline of a network in which a conventional data management system operates.

DETAILED DESCRIPTION OF THE PREFERRED EMBODIMENTS

Several embodiments of the data management system according to the present invention will be described in detail with reference to the accompanying drawings.

Figure 1:
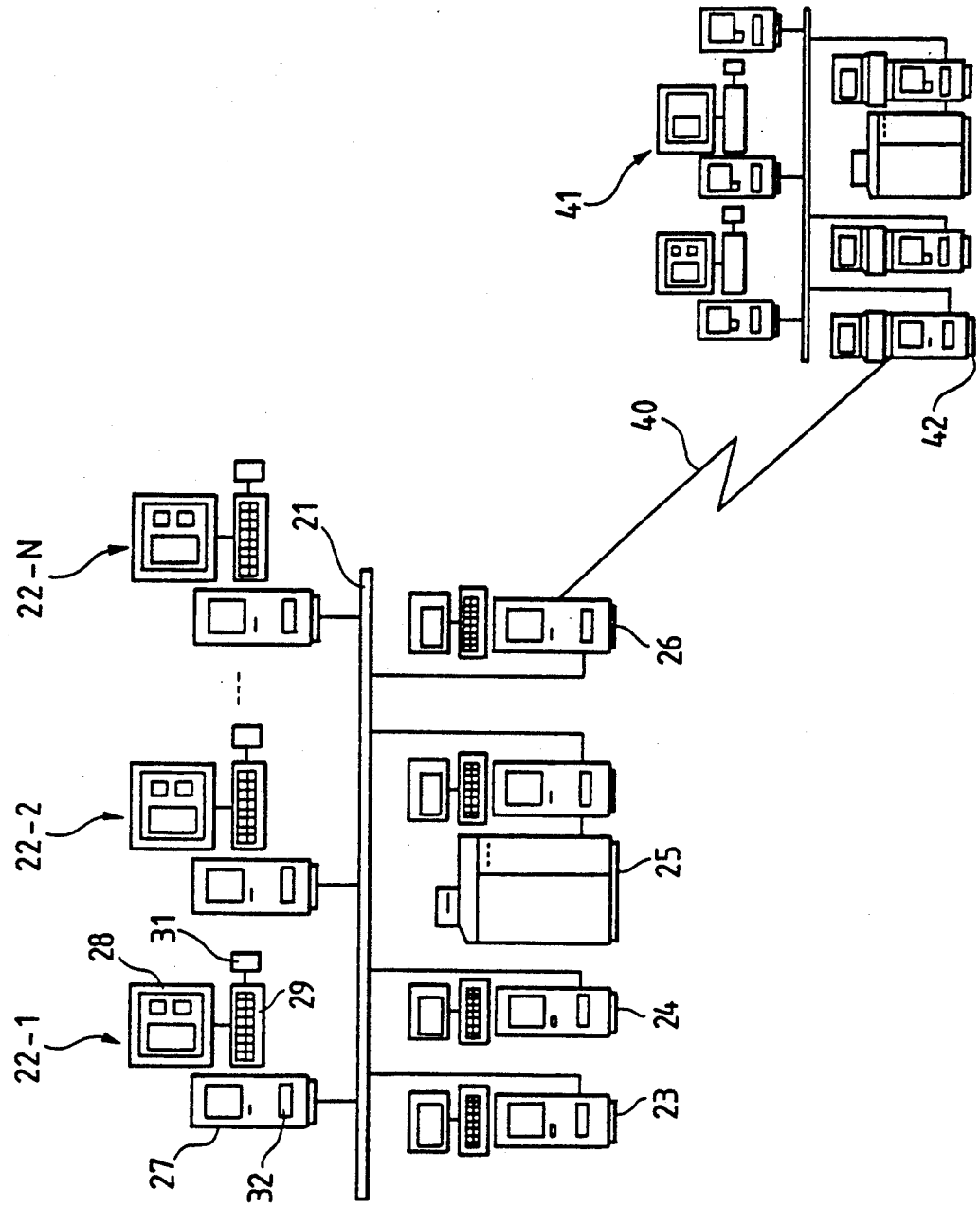
FIGS. 1 shows a system configuration view of a data management system according to a preferred embodiment of the present invention.

FIG. 1 shows a general configuration of the data management system as an embodiment of the present invention. In this data management system, a plurality of work stations 22-1–22-N, a file server 23, a mail server 24, a print server 25, and a communication server 26 are connected to a first communication cable 21 forming a local area network (LAN).

Each of the work stations, 22-1–22-N, is constituted by a controller body 27, a display 28, a keyboard 29, and a mouse 31. Work station 22-1 serves as a management work station, while the other work stations, 22-2–22-N, serve as ordinary work stations, that is, work stations using additional software as an option.

The file server 23 stores files commonly used by the LAN, and the mail server 24 manages electronic mail. The print server 25 prints documents, for example, by means of a laser printer. The communication server 26 provides communication with another local area network through a circuit 40. FIG. 1 illustrates an example in which the communication server 26 is connected to a communication server 42 of another local area network 41. Electronic mail can, therefore, be exchanged not only between the work stations of one local area network, but also between work stations of the second local area networks.

Figure 2:
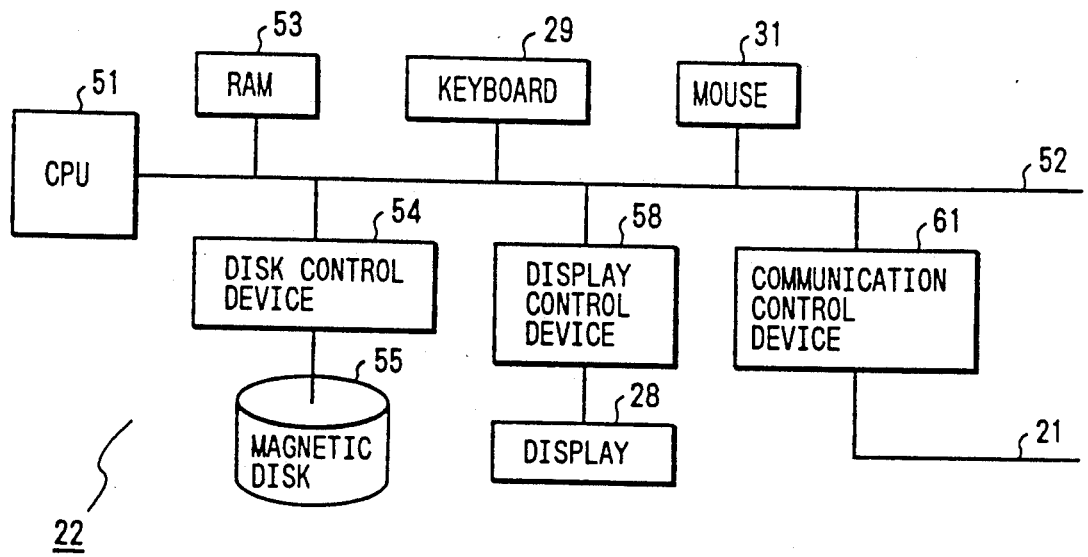
FIG. 2 is a block diagram showing an outline of the circuit configuration of a work station of the system in FIG. 1.
Figure 5:
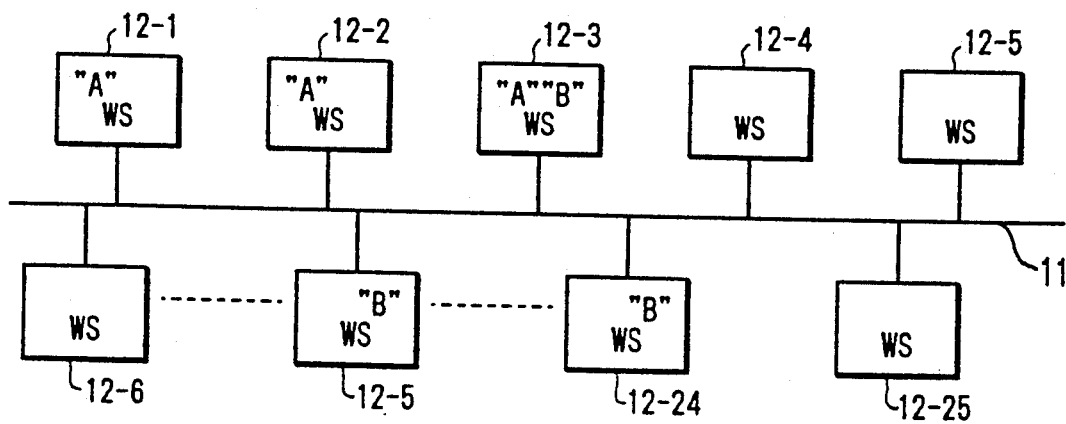

FIG. 2 shows the outline of a circuit configuration of an ordinary work station. Each of the ordinary work stations 22-2, ..., 22-N is provided with a CPU (central processing unit) 51. The CPU 51 is connected to various circuit devices through a data bus 52. A random access memory (RAM) 53 temporarily stores data used in a program. A disk control device 54 controls a magnetic disk 55. Magnetic disk 55 stores programs for controlling the work station and programs for realizing various other functions. However, in order to execute any program, it is necessary to obtain the right of use for that program from the management work station 22-1 each time program is used. The keyboard 29 is an input device. The mouse 31 acts as a display pointing device. A display control device 58 controls the display 28 which is constituted by a CRT or similar device for displaying picture information. A communication control device 61 is connected to the other work stations through a cable 21 and performs input/output of information.

The configuration of the management work station 22-1 is fundamentally the same as that of each of the ordinary work stations 22-2, ..., 22-N shown in FIG. 2. However, the management work station 22-1 is additionally provided with a management table for managing the right of use for software or other such data. The management work station 22-1 suitably updates the contents of the management table. When a request of the right of use is received, the management work station 22-1 determines whether the request should be allowed. After referencing the management table, the management work station 22-1 issues the right of use where such request is allowable. The following Table 1 shows, as an example, a part of the management table.

TABLE 1

| Kind of Software | α | β | ... |
|---|---|---|---|
| Available Software | 2 | 3 | ... |
| Estimated hours of use | 2 hours | 4.5 hours | ... |
| Time-out | 12:00 | 10:30 | ... |
|  |  | 10:40 | ... |
|  |  | 11:00 | ... |
| Total residual hours | 16 hours | 108 hours | ... |

In Table 1, "kind of software" designates the names of respective software which are managed by the management work station 22-1. The software is respectively designated "α," "β, " and so on. The software α may be, for example, graphics software. The software β may be, for example, accounting software. "Available software" indicates the number of the residual software copies which can be used in the network at the same time for each respective software.

"Estimated hours of use" designates an estimated period of use time for an average single use, and is generally expressed in hours. If the data management system fails to receive a notice of termination for the use of software after a period of time has passed equal to the estimated hours of use, then the data management system will proceed under an assumption that use of the software is terminated. Failure to receive notice of termination may be caused by a power failure or a channel disconnection. If the data management system continued to assume use of the software after the estimated hours of use under such conditions, other users would be unnecessarily prevented from using the software, and the network, as a whole, would be over utilized.

"Time-out" indicates the point of time when the right of use established in a particular work station in which will terminate. Time-out is calculated according to the estimated hours of use. In the previously described example, the coincident use of three copies of the software α can be allowed for any of three respective work stations in the network. Under the assumption of this example, Table 1 indicates that only one copy of the software α is currently being used by one work station, and that the time-out for the one copy is 12 o'clock. That is, the management work station 22-1 has given the right of use for the one copy of software α to one work station which requested the right of use for the one copy at 10 o'clock. The management work station 22-1 will release the right of use at 12 o'clock unless a notice of termination of use arrives from he work station before 12 o'clock. The numeral value in the row of "Available Software" will be increased by one at 12 o'clock. A similar process occurs with respect to software β. That is, three copies of the software β are currently being used, and it is estimated that the use of these three copies will be automatically terminated at the three indicated times, each time corresponding to a copy of the software β.

"Total residual hours" indicates a sum total of the residual time for which respective software can be used in the network as a whole. With respect to the software α, the total residual hours are indicated as 16 hours. Accordingly, if the right of use is given eight additional times and two hours are designated as the estimated hours of use for each respective right of use, then all of the hours for software α will be consumed.

Figure 3:
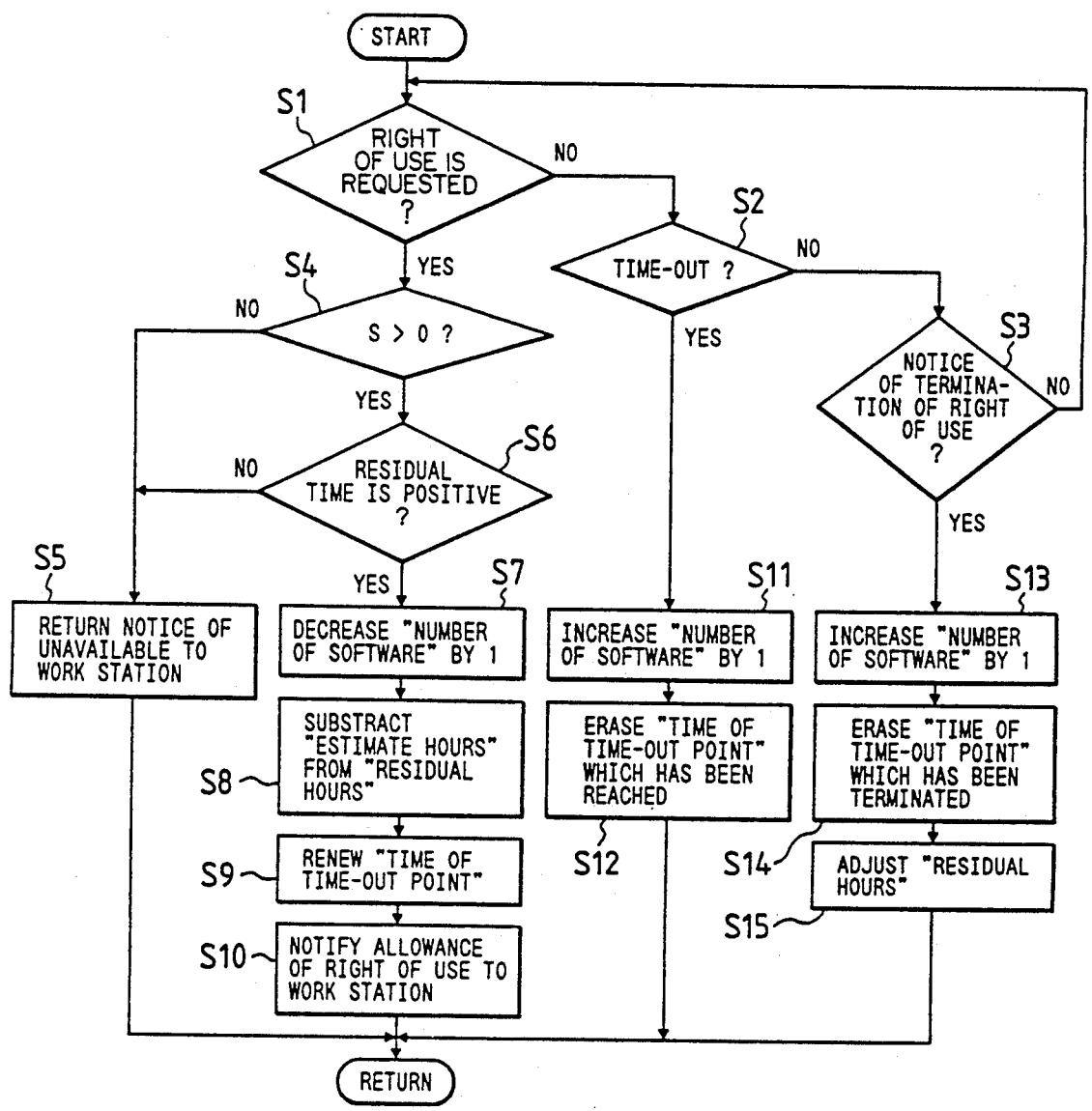
FIG. 3 is a flowchart showing the main portion of the control contents of a management work station of the system in FIG. 1.

FIG. 3 shows the management process of the management work station. The management work station 22-1 monitors requests for a right of use (Step 1), timeout with respect to any particular copy of software being used (Step 2), and notice of termination for the right of use (Step 3) by any of the ordinary work stations 22-2, . . . , 22-N.

If a right of use is requested the management work station 22-1 determines whether the number (S) of available copies of the software is positive or not by referring to the management table (Step 4). If the number is not positive, the management work station 22-1 determines in view of the number of copies of the software which can be used on the network at any given time, that the request must be denied. Accordingly, the management work station 22-1 terminates processing after giving notice that the right of use for the requesting work station (Step 5). Even when the number S of software copies is positive, the notice of unavailability will be given where the residual time is not positive (NO in the Step 6).

In the case where S and the residual time for the software is positive (YES in the Step 6), the management work station 22-1 decrements the "Available Software" indicates in the management table (Step 7), and correspondingly adjusts the numerical value of the "Total residual hours" in the management table (Step 8). That is, the management work station 22-1 reads the residual hours for the software from the management table, subtracts the estimated hours of use from the read residual hours, and rewrites the "Total residual hours" in the management table based on the result.

In order to perform the time-out management, the management work station 22-1 rewrite the "Time-out" indicator for the software in the management table with value obtained by adding the estimated hours of use to the present time (Step 9). Upon completing the above operation, the management work station 22-1 gives notice that the right of use for the software has been allowed to the requesting work station (Step 10).

By means of an integral clock mechanism (not shown) the management work station 22-1 monitors time with respect to each "Time-out" written in the management table (Step 2). When time equals the "Time-out" for a respective software cop (YES in the step 2), the "Available Software" indicator for the software is incremented in the management table (Step 11).

Accordingly the number of available software copies which can be used on the network at any given time is increased by one under the assumption that use of that particular software copy is terminated. The corresponding "Time-out" is erased from the management table (Step 12). This process may be applied to a plurality of "Time-out" indicators which expire at the same time.

Notice of termination for a right of use given to any of the ordinary work stations 22-2, . . . , and 20-N will be described. Effective management of software use requires notice of termination at the correct time in order to prevent unauthorized use of the software. Upon a determination of a notice of termination for use of software (YES in the step 3), the management work station 22-1 increments the "Available Software" indicator in the management table (Step 13), and erases the "Timeout" indicator for the software in question (Step 14). In a case where notice of termination for use of the software is received after time equals "Time-out", it is not necessary to erase the "Time-out" indicator because it has already been erased from the management table in step 12.

Thereafter, the residual hours allocated for the software are adjusted in accordance with the received notice of termination (Step 15). In a case of normal use of the software, if the actual hours of use are less than the estimated hours of use, the residual hours of the software are correspondingly increased. On the contrary, when the actual hours of use are more than the estimated hours of use, the residual hours are correspondingly decreased. The above management may be performed on the basis of the time data indicated by the work station which has given the notice. Alternatively, the management may be performed by use of the integral clock mechanism in the management work station 22-1. In a case where a work station having been given the right of use for software does not use the software and upon a notice of termination is given from the work station, the management work station 22-1 increases the residual hours for the software by the estimated hours of use.

FIG. 4 shows the control operation performed in each of the ordinary work stations which will request the right of use of software. Each of the ordinary work stations 22-2, . . . , and 22-N determines whether or not a request of use of software is made by an operator (Step 1) and whether or not a reply is given by the management work station 22-1 (Step 2).

Upon request of use of software by an operator (YES in the Step 1), a determination is made as to whether or not the software exists in the magnetic disk 55 of the work station (Step 3). If the software exists in the magnetic disk 55 of the work station (YES in the Step 3), the work station transmits a request of right of use of the software to the management work station 22-1 (Step 4). If, however, the software does not exist in the magnetic disk 55 of the work station (NO in the Step 3), a prompt is displayed on the display 28 to inform the operator that the software does not exist (Step 5). Upon receipt of the prompt, the operator will cease attempts to use the software, or, if possible, will copy the software from another work station. If the operator selects processing such that the software is copied from another work station and the operation described in FIG. 4 starts again the step 1.

Upon receipt of a reply to a request for right of use of software from the management work station 22-1 (YES in the Step 2), the requesting work station determines whether or not the reply indicates allowance of the right of use of the software (Step 6). Where the right of use is allowed (YES in the Step 6), the software can be used until termination (Steps 7 and 8). Specifically, the software in question is transferred from the magnetic disk 55 into RAM 53 so that the software is to be executed. At the ordinary termination or termination due to any cause originating in the use of the software (YES in the Step 7), the work station transmits a notice of termination to the management work station 22-1 (Step 9). When the work station receives a notice indicating that the right of use of the software cannot be allowed from the management work station 22-1 (NO in the step 6), the fact that the requested software cannot be used is displayed on the display 28 (Step 10).

Although description has been made in the above embodiment on the assumption that the management work station 22-1 does not use software as option, the management work station 22-1 may be so arranged that it may request use of software from itself and use the software when right of use of the software is given.

Although description has been made in the above embodiment under the assumption that the data which are objects of the management system are copies of software programs, the teachings may be readily applied where the data is any information having economical value, for example, an electronic dictionary or where the data has limited time use or use value. Furthermore, although one of work stations is designated as a management work station in the embodiment, a software management server or a data management server such as the file server 23 or the mail server 24 may be provided on the network.

In the above embodiment any of the work stations 22-2, ..., and 22-N may asynchronously request a right of use. However, where such requests are controlled in a sequential circular ring arrangement, i.e., ordered requests by respective work stations 22-2, ..., and 22-N, there may be an information processing device which cannot use the data. A method of preengagement ordering of the right of use is effective as one method of managing right of use. In a network using such a method, the management device allocates the residual available copies of data with respect to predetermined time slots. Accordingly, if an empty time slot occurs before an information processing device's assigned time slot, it is possible to establish a right of use for that information processing device within the available time.

It is also possible to distinguish multiple requests for a right of use among information processing devices, if information processing devices are assigned an order for making such requests. Furthermore, requests for a right of use are prioritized on the basis of the number of previous refusals of an assigned right of use by respective the information processing devices. The number of previous refusals are recorded in the management device and the management device may give higher priority to the information processing device having the greatest number of refusals.

A table showing the state of use for software or other data to be managed offers several advantages. The state in which software or other data is being used is accurately comprehended and the table is useful for management of contract renewal for the software or other data. By using the table, a management device may establish a right of use, and thereby centrally manage working state of each information processing device in a network.

Software or other data copies can be accurately managed in a network.

Such data can be used time-divisionally by a plurality of work stations, so that the data can be efficiently used. Furthermore, control information can be constructed through processing data regarding transfers among work stations, etc.

Since the number of the information processing devices which can use specific data at the same time is economically limited and because the present invention maintains a total residual time in which the specific data can be used, software and other data can be used without change in the existing contract even if the number or arrangement of the work stations in the network is changed. Even in the case where the information processing device which has been using the data fails to give notice that the use is terminated, the table management is performed on the assumption that the data has been used for a statistically estimated number of hours, so that the use state of the data can be accurately managed.

Additionally, when the information processing device which has used data gives a notice of termination, the notice is taken into consideration in the table, so that an opportunity for data use data can be immediately given to any other information processing device when the use of the data is terminated after a relatively short use time. The management device is provided independent of the information processing devices, and as such the management of data can be accurately and fairly made by the exclusive management device. The exclusive management device, however, need not be a custom device but may be selected for one of the available information processing devices. Accordingly, when a management device breaks down, another device can be substituted thereby improving system reliability.

Finally, since a right of use can be preengagment ordered work schedule can be easily managed with respect to every information processing device and the system operation can be efficiently carried out.

Establishment of a right of use can also be made according to the order or by the number of previous refusals for the right use by a particular information processing device.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A method of managing a plurality of data in an information processing network having a plurality of information processing workstations, each having first data storage means for storing the plurality of data and first memory means, a management workstation having second memory means for storing a management table, connecting means for connecting the plurality of information processing workstations to the management workstation, wherein the management table includes for each one of the plurality of data a first value indicating a number of residual copies available for use by the plurality of information processing workstations, a second value indicating an amount of residual time that each one of the plurality of data can be used by the plurality of information processing workstations, and a third value indicating an estimated duration of use, the method comprising the steps of:

requesting, by one of the plurality of information processing workstations from the management workstation via the connecting means, a right of use for at least one of the plurality of data;

granting, by the management workstation, the right of use whenever the first and second values are greater than zero, otherwise denying the right of use;

subtracting, upon granting the request for right of use, one from a first value and subtracting a third value from a second value, all the values corresponding to the at least one of the plurality of data;

transferring the at least one of the plurality of data from the first storage means to the first memory means of the requesting one of the plurality of information processing workstations; and storing, by the requesting one of the plurality of information processing workstations, the transferred at least one of the plurality of data in the first memory means of the requesting one of the plurality of information processing workstations.

2. The method of claim 1, further comprising the steps of:

indicating by one of the plurality of information processing workstations to the management workstation that use of one of the plurality of data is completed; and, increasing by one a corresponding first value in the management table for each indication of completion the each one of the plurality of data.

* * * * *